(12) United States Patent
Brill et al.

(10) Patent No.: US 9,682,632 B2
(45) Date of Patent: Jun. 20, 2017

(54) CHARGING DEVICE FOR INDUCTIVE CHARGING

(75) Inventors: Roland Brill, Erlangen (DE); Rainer Knorr, Regensburg (DE); Anja Lipold, Fürth (DE); Dragan Mikulec, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 174 days.

(21) Appl. No.: 14/423,375

(22) PCT Filed: Aug. 23, 2012

(86) PCT No.: PCT/EP2012/066427
§ 371 (c)(1),
(2), (4) Date: Mar. 19, 2015

(87) PCT Pub. No.: WO2014/029439
PCT Pub. Date: Feb. 27, 2014

(65) Prior Publication Data
US 2015/0224882 A1    Aug. 13, 2015

(51) Int. Cl.
*H01M 10/46* (2006.01)
*B60L 11/18* (2006.01)
*H01F 38/14* (2006.01)

(52) U.S. Cl.
CPC ......... *B60L 11/182* (2013.01); *B60L 11/1829* (2013.01); *H01F 38/14* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .......... H02J 5/005; H02J 7/0042; H02J 7/355
USPC ........................ 320/107, 108, 109, 114, 115
See application file for complete search history.

(56) References Cited

U.S. PATENT DOCUMENTS

| 5,850,135 | A | 12/1998 | Kuki et al. |
| 6,150,794 | A | 11/2000 | Yamada et al. |
| 8,264,197 | B2 * | 9/2012 | Shimoyama ......... B60L 11/182 320/108 |
| 2010/0235006 | A1 | 9/2010 | Brown |
| 2011/0074346 | A1 | 3/2011 | Hall et al. |
| 2011/0133692 | A1 | 6/2011 | Shimoyama |
| 2011/0181240 | A1 * | 7/2011 | Baarman ............... B60L 11/182 320/108 |
| 2013/0033227 | A1 | 2/2013 | Gibbons, Jr. |

(Continued)

FOREIGN PATENT DOCUMENTS

| CN | 1220035 A | 6/1999 |
| EP | 0788212 A2 | 8/1997 |
| FR | 2740921 A1 | 5/1997 |

(Continued)

*Primary Examiner* — Edward Tso
(74) *Attorney, Agent, or Firm* — Laurence A. Greenberg; Werner H. Stemer; Ralph E. Locher

(57) ABSTRACT

A charging device for inductively charging a drive battery of an electrically-drivable vehicle includes a primary coil, which can be moved in a first direction towards a secondary coil of the vehicle by a pressurized medium. The primary coil is disposed on a holding device which is at least partially elastic. A method for positioning a primary coil for inductively charging a drive battery of an electrically-drivable vehicle is also provided.

34 Claims, 6 Drawing Sheets

(56) References Cited

U.S. PATENT DOCUMENTS

2013/0076902 A1\* 3/2013 Gao .................... B25J 9/042
　　　　　　　　　　　　　　　　　　　　　348/148

FOREIGN PATENT DOCUMENTS

GB　　　　2471879 A　　1/2011
WO　　2011044969 A2　　4/2011

\* cited by examiner

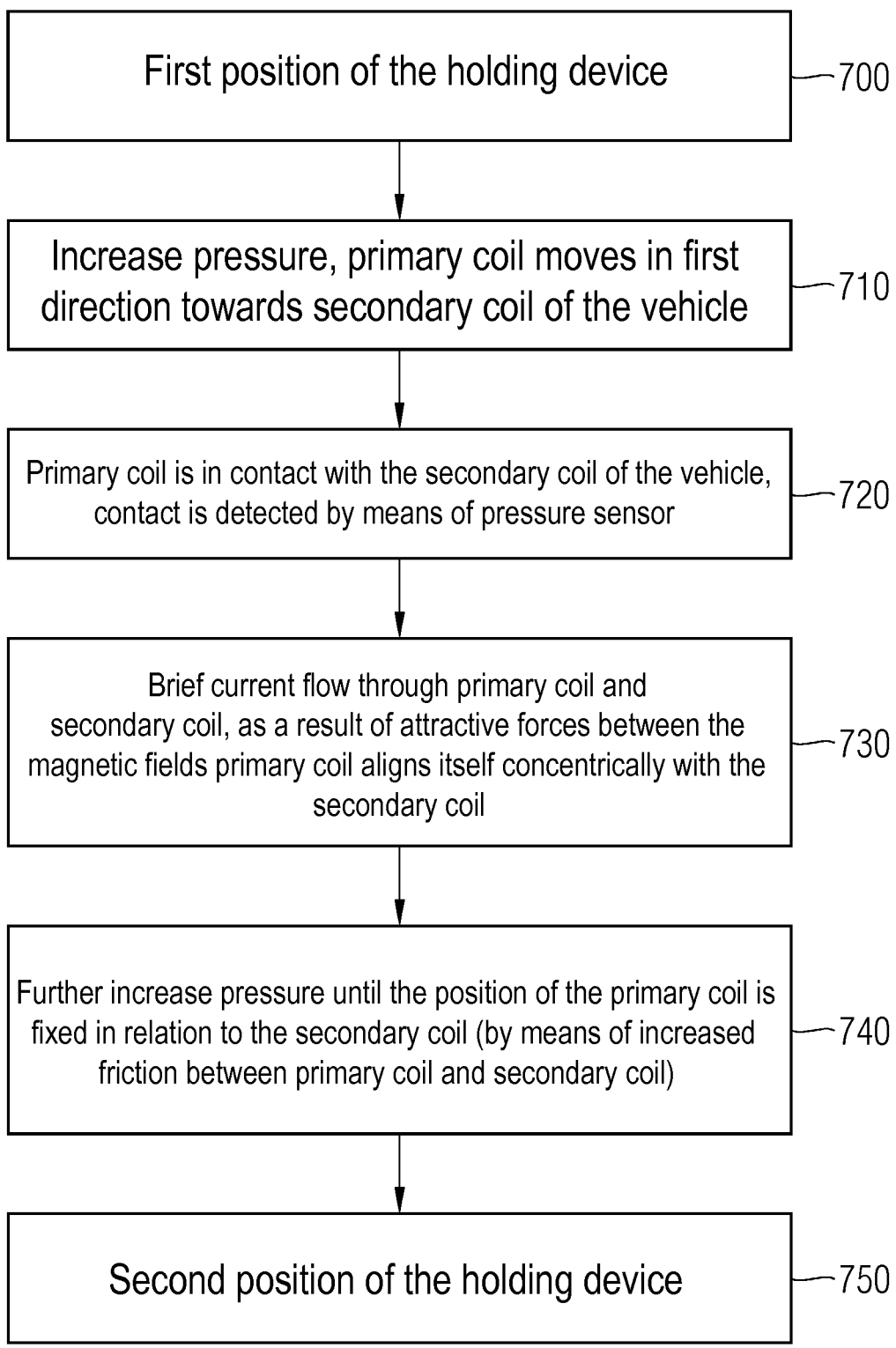

CHARGING DEVICE FOR INDUCTIVE CHARGING

BACKGROUND OF THE INVENTION

Field of the Invention

The invention relates to a charging device for inductively charging a drive battery of an electrically-drivable vehicle and a method for positioning a primary coil for inductive charging.

Electrically-drivable vehicles have a drive battery (accumulator) which provides the electrical energy required for driving. Discharged batteries must be re-charged by means of a charging device as required. To this end, the drive battery of the electrically-drivable vehicle and the charging device are frequently connected to each other electrically by means of a charging cable. The establishing of this electrical connection is sometimes perceived as onerous, in particular if the cable is long, dirty or wet or if the connectors are heavy.

An electrical connection with a charging cable is not necessary if the drive battery is inductively charged. A primary coil is arranged outside the vehicle which transfers electrical energy to a secondary coil of the vehicle by means of an electromagnetic field. The efficiency of this wireless energy transmission essentially depends on the distance between the primary coil and the secondary coil and how precisely the primary coil is aligned with the secondary coil.

An inductive charging device is known from the patent application US 2011/0181240 A1 in which the primary coil is moved towards the secondary coil of the vehicle by means of compressed air technology. The position of the vehicle is fixed by a block with a recess into which the wheels of the vehicle drive.

Furthermore, an inductive charging device is known from the international patent application WO 2011/044969 A2, in which the primary coil is laid in an elevation of the ground and the wheels of the vehicle are positioned in a depression.

The task of the invention is to specify a device and a method which enables secure and reliable positioning of the primary coil for inductive charging.

BRIEF SUMMARY OF THE INVENTION

According to the invention this object is achieved by a charging device and a method as claimed in the independent claims. Advantageous embodiments are specified in the dependent claims.

A charging device is specified according to the invention for inductively charging a drive battery of an electrically-drivable vehicle with a primary coil, which can be moved in a first direction towards a secondary coil of the vehicle by means of a pressurized medium, wherein the primary coil is arranged on a holding device which is at least partially elastic. This holding device then has at least elastic properties when the primary coil has been moved towards the secondary coil of the vehicle, i.e. when the primary coil is in the charging position. In this charging position the primary coil is arranged as closely as possible to the secondary coil of the vehicle. However, the holding device may also be permanently elastic, i.e. have permanently elastic properties.

As a result of the elasticity of the holding device the primary coil and/or the secondary coil are then advantageously protected from damage, in particular if the electrically-drivable vehicle moves during the charging process. Such a movement may occur, for example, if a person climbs into the vehicle or if the vehicle is loaded during the charging process. Then the suspension of the wheels of the vehicle is compressed more significantly and the secondary coil of the vehicle moves downwards. With a primary coil in a fixed arrangement there is then a risk of the primary coil and/or the secondary coil being damaged as a result of this movement. This risk is also considerable because the primary coil and/or the secondary coil often comprise brittle ferrite material. This risk is reduced by the elastic holding device because in such a movement of the vehicle the primary coil can recoil elastically and damage is therefore avoided.

The charging device can be designed in such a way that the medium under pressure is a gas, in particular compressed air.

The charging device can be designed in such a way that the holding device connects the primary coil to a substrate (which is passable by the vehicle). As a result, the primary coil is elastically linked to the (rigid) substrate, enabling the primary coil to recoil elastically in the event of movement of the vehicle without damage occurring.

The charging device can be designed in such a way that the holding device has bellows, in particular expansion bellows, which can be filled with the medium. With such bellows, which alter in length while being filled with the medium, the primary coil can be advantageously moved towards the secondary coil. Furthermore, the bellows have elastic properties when filled partially or fully with the medium.

The charging device can be designed in such a way that the primary coil is arranged at one end of the bellows.

The charging device can also be designed in such a way that the holding device has a hose which can be filled with the medium or the holding device has a cushion which can be filled with the medium. When in an unfilled state, such a hose or such a cushion are flat in shape so that there is a space between the primary coil and the secondary coil of the vehicle. As the amount of medium filled increases, the thickness of the hose and/or the thickness of the cushion increases and the primary coil moves towards the secondary coil of the vehicle as a result. A partially or fully filled hose and/or a partially or fully filled cushion advantageously displays elastic properties.

The charging device can also be designed in such a way that the holding device has a membrane which can be curved upwards with the medium. If the membrane is impinged on by the pressurized medium then the membrane is curved upwards, moving a primary coil arranged on the membrane in the direction of the secondary coil of the vehicle. This membrane also has elastic properties when curved upwards so that the primary coil is arranged elastically on the holding device and/or is supported by it.

The charging device can be designed in such a way that the membrane forms a ring around the primary coil. A membrane designed in this way enables movement of the primary coil in the first direction towards the secondary coil.

The charging device can also be equipped in such a way that the primary coil is arranged so that it can be moved in a second direction. This makes it possible to adjust the primary coil even better in relation to the secondary coil.

The charging device can be designed in such a way that the elasticity of the holding device enables displacement of the primary coil in the second direction. The elastic holding device advantageously enables not only an elastic recoiling of the primary coil upon the application of external forces, but also permits an alignment of the primary coil in the second direction (on account of the elastic deformation of the holding device).

The charging device can also be designed in such a way that the primary coil is mounted in a sliding bearing which enables a displacement of the primary coil in the second direction. By means of such a sliding bearing, further displacement of the primary coil is enabled in the second direction.

The charging device can be constructed in such a way that it has a pressure sensor for measurement of the contact pressure between the primary coil and the secondary coil and/or a pressure sensor for measurement of the pressure of the medium. When the primary coil comes into contact with the secondary coil during the movement in the first direction can be advantageously detected by means of such a pressure sensor. In this case, the contact pressure between the primary coil and the secondary coil increases. At the same time, the pressure of the medium increases.

The charging device can also be designed in such a way that the holding device is recessed in a first position in a substrate (passable by the vehicle). This first position is an idle position of the holding device and the primary coil. The first position occurs in the idle state of the charging device. In this connection, it is advantageous that in the idle state of the charging device the holding device can be brought into the first position and is then recessed in the substrate. By this means interfering obstacles which protrude from the substrate are avoided. In addition, the primary coil is protected in the first position.

The charging device can also be designed in such a way that in a second position the holding device protrudes from the substrate in the first direction. This second position is the operating position and/or charging position of the holding device and the primary coil. To charge a vehicle, the holding device is advantageously brought into the second position in which the holding device protrudes from the substrate in the first direction (in the direction of the secondary coil).

The charging device can be designed in such a way that the second direction is perpendicular to the first direction.

The charging device can in particular be designed in such a way that the first direction is the vertical direction and the second direction is a horizontal direction.

Specified according to the invention furthermore is a method for positioning a primary coil for inductively charging a drive battery of an electrically-drivable vehicle, wherein with the method a primary coil can be moved in a first direction towards a secondary coil of the vehicle by means of a pressurized medium, wherein the primary coil is moved in the first direction by a holding device which is at least partially elastic (which is acted upon by the medium).

This method can be designed in such a way that the pressurized medium is a gas, in particular compressed air.

The method can be executed in such a way that the primary coil is moved in the first direction by means of the medium until the primary coil is in contact with the secondary coil. This advantageously enables the primary coil to get very close to the secondary coil of the vehicle, as a result of which higher efficiency in the transmission of energy is possible.

The method can be executed in such a way that contact is detected by means of at least one pressure sensor. Upon detection of contact, the movement of the primary coil can be stopped by, for example, the pressure of the medium not being further increased.

In the process, the method can be executed in such a way that the contact pressure between the primary coil and the secondary coil is measured by the pressure sensor or the pressure of the medium is measured by the pressure sensor. Namely, as soon as the primary coil comes into contact with the secondary coil, contact pressure results between the primary coil and the secondary coil which is measured by means of the pressure sensor. At the same time, the pressure of the medium increases as the primary coil does not move further.

The method can be executed in such a way that the holding device enables displacement of the primary coil in a second direction. The displacement of the primary coil in the second direction enables even better alignment of the primary coil with the secondary coil of the vehicle.

The method can be designed in such a way that electric current is conducted through the primary coil, as a result of which the primary coil aligns itself (in the second direction) with the secondary coil. In the process, the primary coil aligns itself with a magnetic field of the secondary coil. The electric current generates a magnetic field in the primary coil. The secondary coil also has such a magnetic field (because for example, electric current is conducted through the secondary coil at the same time). Due to the attraction of the two magnetic fields, the primary coil aligns itself with the secondary coil. The efficiency of the wireless energy transmission between the primary coil and the secondary coil is increased still further as a result of this alignment.

The method can be designed in such a way that electric current is conducted through an electromagnet arranged on the primary coil, as a result of which the primary coil aligns itself (in the second direction) with the secondary coil. In the process, the primary coil can in particular align itself with an electromagnet arranged on the secondary coil through which electric current is likewise conducted.

The method can also be designed in such a way that the primary coil aligns itself concentrically with the secondary coil. Advantageously, the primary coil aligns itself with the secondary coil in such a way that both coils are arranged concentrically. In a concentric alignment and/or arrangement, the primary coil and the secondary coil are arranged around a common center or around a common axis.

The method can be executed in such a way that the pressure of the medium is increased after alignment as a result of which the position of the aligned primary coil is fixed with regard to the secondary coil. The increased pressure of the medium increases the pressure of the primary coil against the secondary coil. As a result, the frictional forces between the primary coil and the secondary coil are increased. These increased frictional forces ensure that the position of the aligned primary coil no longer changes but is fixed in relation to the secondary coil.

The method can be designed in such a way that the second direction is aligned perpendicular to the first direction.

In particular, the method can be designed in such a way that the first direction is the vertical direction and the second direction is a horizontal direction.

Furthermore, this method likewise has the benefits which are specified above in connection with the charging device.

BRIEF DESCRIPTION OF THE SEVERAL VIEWS OF THE DRAWING

The invention is explained in more detail hereinafter with reference to exemplary embodiments. The figures show in FIG. 1 a schematic view of a first exemplary embodiment of a charging device with bellows, in FIG. 2 a further exemplary embodiment of a charging device with a hose, in FIG. 3 a further exemplary embodiment of a charging device with a cushion, in FIG. 4 a further exemplary embodiment with a holding device with a membrane in a first position, in FIG. 5 the holding device of FIG. 4 in a second position, in FIG. 6 the holding device of FIG. 4 in a top view and in FIG. 7 a flow chart of an exemplary embodiment of a method for positioning.

DESCRIPTION OF THE INVENTION

Figure 1:
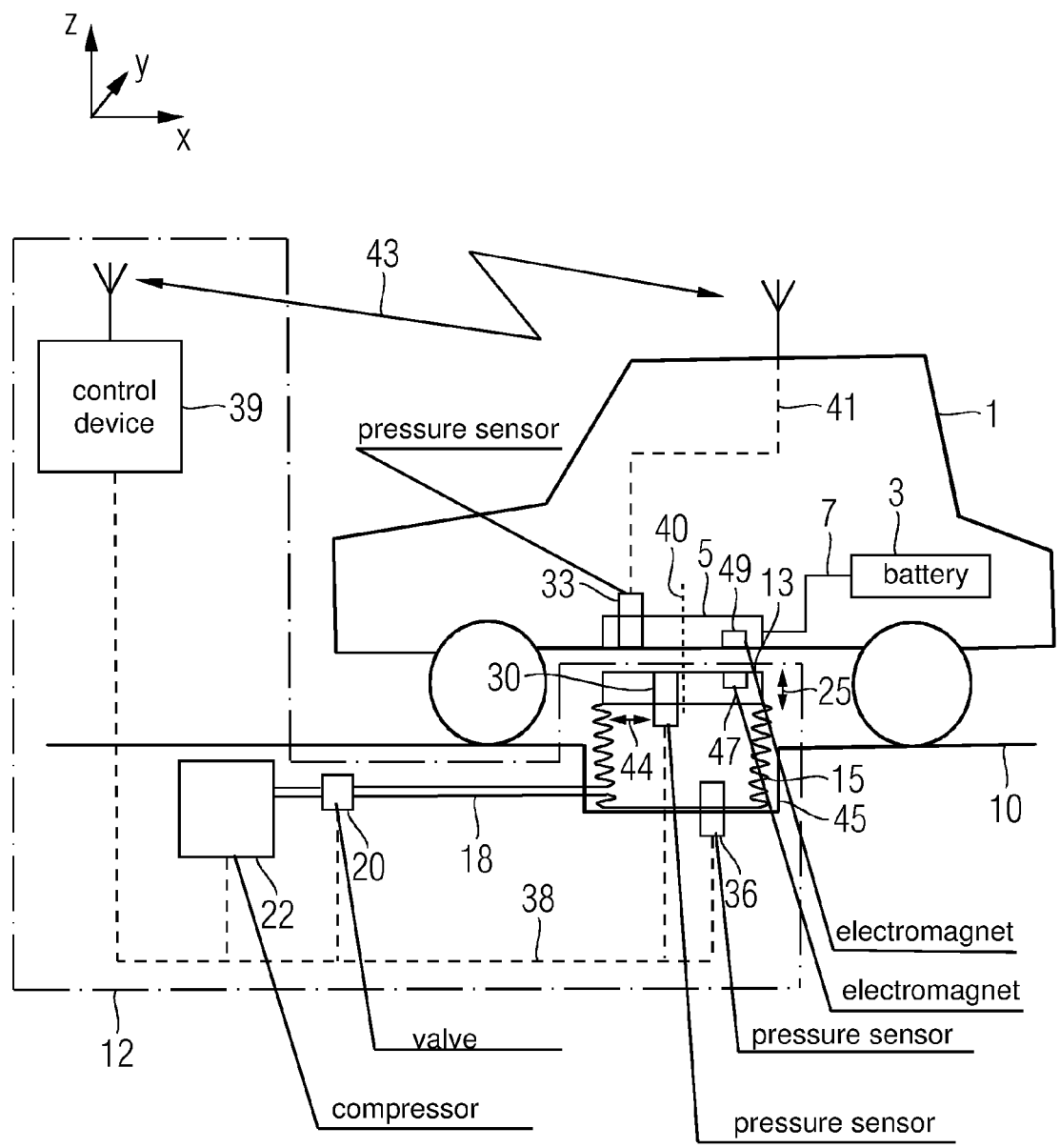

FIG. 1 shows a schematic view of an electrically-drivable vehicle 1. This electrically-drivable vehicle 1 has a drive battery 3 which stores the electrical energy required for driving. The drive battery 3 can be charged by means of a secondary coil 5. During charging electrical energy is conducted from the secondary coil 5 to the drive battery 3. This is only shown symbolically by an electrical connection 7.

The electrically-drivable vehicle 1 is on a substrate 10 which is passable by the vehicle. This substrate may, for example, be the ground, a street, a parking lot or a parking space in a parking block. Arranged on the substrate is a charging device 12 of which only selected components are shown in the exemplary embodiment of FIG. 1. This charging device has a primary coil 13.

The primary coil and the secondary coil can e.g. have a diameter of between 30 and 60 cm. Smaller coils are advantageous because they require less installation space, weigh less and can be better integrated into the charging device and into the vehicle.

The primary coil 13 is arranged on a holding device 15. The holding device 15 is embodied in the exemplary embodiment as bellows 15, or more precisely expansion bellows. The primary coil 13 is arranged at the end of the bellows 15. The bellows are connected to a compressor 22 via a pressure line 18 and an electrically controllable valve 20.

The compressor 22 generates a pressurized medium in the form of compressed air. (In other exemplary embodiments other gases can also be used as a medium instead of compressed air.) This pressurized medium reaches the bellows 15 from the compressor with an open valve 20 via the compressed air pipe 18 and results in the bellows 15 extending i.e. enlarging along the arrow 25. As a result, the primary coil 13 is moved in a first direction (which corresponds to the Z-direction in the exemplary embodiment) towards the secondary coil 5 of the vehicle 1. When the pressure in the bellows 15 is increased by means of the compressor 22, the primary coil 13 is moved towards the secondary coil 5 and the distance between the two coils is reduced. When the valve 20 is closed, the pressure in the holding device 15 (here: in the bellows 15) remains constant and the primary coil remains in its respective position. When pressure is released by means of the valve 20, the pressure in the holding device 15 is reduced and the primary coil 13 sinks down on account of its weight, i.e. the primary coil moves away from the secondary coil 5 of the vehicle 1.

In the exemplary embodiment the air pressure in the bellows 15 is increased by means of the compressor 22. Thereupon the primary coil 13 moves in the first direction until the primary coil 13 comes into contact with the secondary coil 5. This contact is detected by means of a first pressure sensor 30, a second pressure sensor 33 and/or a third pressure sensor 36. The contact pressure between the primary coil 13 and the secondary coil 5 is measured by means of the first pressure sensor 30. The first pressure sensor 30 is arranged on the primary coil 13. Alternatively, or in addition, the contact pressure between the primary coil 13 and the secondary coil 5 can also be measured by means of the second pressure sensor 33. For this, the second pressure sensor 33 is arranged on the secondary coil 5. The first pressure sensor and/or the second pressure sensor can also be designed as a simple switch which switches over on reaching a predetermined contact pressure, as a result of which a corresponding signal is produced. Alternatively, or in addition, the pressure of the medium (here: the air pressure in the bellows) can also be measured by means of the third pressure sensor 36. As soon as the primary coil 13 comes into contact with the secondary coil 5 and therefore ceases to move, namely the pressure in the bellows 15 increases. This increased pressure results in the detection of the primary coil 13 being in contact with the secondary coil 5 of the vehicle 1. The signals of the first pressure sensor 30 and/or the third pressure sensor 36 are transmitted via communication links 38 displayed as dotted lines to a control device 39 which controls the components of the charging device (here in particular, the compressor 22 and the valve 20). The measured values of the second pressure sensor 33 are likewise transferred via a communication link 41 and via a schematically displayed wireless communication link 43 to the control device 39.

As soon as the contact between the primary coil and the secondary coil is detected, the valve 20 is closed so that the pressure in the bellows 15 remains constant and the contact pressure between the primary coil 13 and the secondary coil 5 increases no further. Optionally, the compressor 22 can also be switched off.

In this filled state, the bellows 15 have elastic properties. Due to the thin walls of the bellows, the primary coil 13 can be moved in a second direction (in the exemplary embodiment this direction is on the X-Y plane). A displacement of the primary coil in this second direction is therefore possible. In the second position displayed, the elasticity of the holding device 15 therefore enables the primary coil to be displaced in the second direction, i.e. a displacement of the primary coil along the arrow 44.

In order to align the primary coil 13 more precisely with the secondary coil 5, direct current is now conducted through the primary coil for a short time (e.g. for a few seconds). Thereupon a magnetic field is created around the primary coil 13. At the same time direct current is conducted through the secondary coil 5 as a result of which a magnetic field is also created around the secondary coil 5. The magnetic field of the primary coil and the magnetic field of the secondary coil 5 attract. As a result the primary coil 13 is displaced in the second direction (i.e. here on the X-Y plane), until the primary coil 13 is aligned with the secondary coil 5. In particular, a concentric alignment of the two coils with each other is achieved, i.e. both the primary coil 13 and the secondary coil 5 have a common center in the aligned state and/or are aligned with regard to a common axis. This common axis is indicated as an axis 40 in the exemplary embodiment. In FIG. 1 the aligned state of the primary coil is therefore displayed in the second position of the holding device. In this second position the holding device with the primary coil arranged thereon protrudes from the substrate 10 in the first direction. (An air gap is only displayed between the primary coil 13 and the secondary coil 5 in FIG. 1 for reasons of clarity. Advantageously, this air gap is negligibly small when the primary coil 13 and the secondary coil 5 are in contact.)

Alternatively, the primary coil can also be aligned by means of an electromagnet. At least one electromagnet 47 is arranged on the primary coil and at least one further electromagnet 49 on the secondary coil. Direct current is passed through the two electromagnets; the resulting magnetic field of the electromagnet 47 and the resulting magnetic field of the electromagnet 49 attract. As a result, the primary coil 13 is displaced in the second direction until the primary coil 13 is aligned with the secondary coil 5.

After the alignment of the primary coil 13, the valve 20 is opened and as a result the pressure of the medium in the bellows 15 is further increased. As a result, the contact pressure between the primary coil 13 and the secondary coil 5 is increased and the frictional forces between the primary coil 13 and the secondary coil 5 increase. Therefore, the aligned primary coil is fixed in relation to the secondary coil 5, i.e. the position of the primary coil is ascertained in relation to the secondary coil 5.

Now the inductive charging process can begin by means of alternating current being applied to the primary coil. An electromagnetic alternating field arises as a result of this alternating current which penetrates the secondary coil 5. In the known manner, in the secondary coil 5 an electric current is induced which is used to charge the drive battery 3. The components of the charging device which are required for the actual inductive charging process such as, for example, switching devices, inverters or power electronic components, are not shown in FIG. 1 for reasons of clarity. Such components are not shown on the sides of the vehicle 1 either.

After completion of the inductive charging process, the valve 20 is opened, as a result of which the pressure in the bellows 15 is reduced. (Alternatively, the bellows can also be evacuated by means of a pump or by means of the compressor.) The primary coil 13 sinks down on account of its weight and is completely recessed in the substrate 10 together with the holding device 15. There is a recess 45 in the substrate 10 for this purpose which accommodates the holding device and the primary coil. This is now the first position in which the holding device is completely recessed in the substrate 10.

The valve 20 is designed in such a way that the pressure of the medium decreases as soon as the valve is no longer supplied with current (e.g. in the event of power failure). As a result, the holding device is brought into the first position in which the holding device and the primary coil are protected in the substrate.

On account of the compressible medium and the mobile bellows, the holding device 15 is elastic at least in the second position shown in FIG. 1, i.e. it has elastic properties. If the medium is released from the holding device 15 and the holding device 15 together with the primary coil is located in the recess 45 of the substrate 10, then the holding device does not have elastic properties. At this time, however, the elastic properties are not necessary either because the primary coil 13 is protected in the recess 45 and therefore at a great distance from the vehicle 1.

Figure 2:
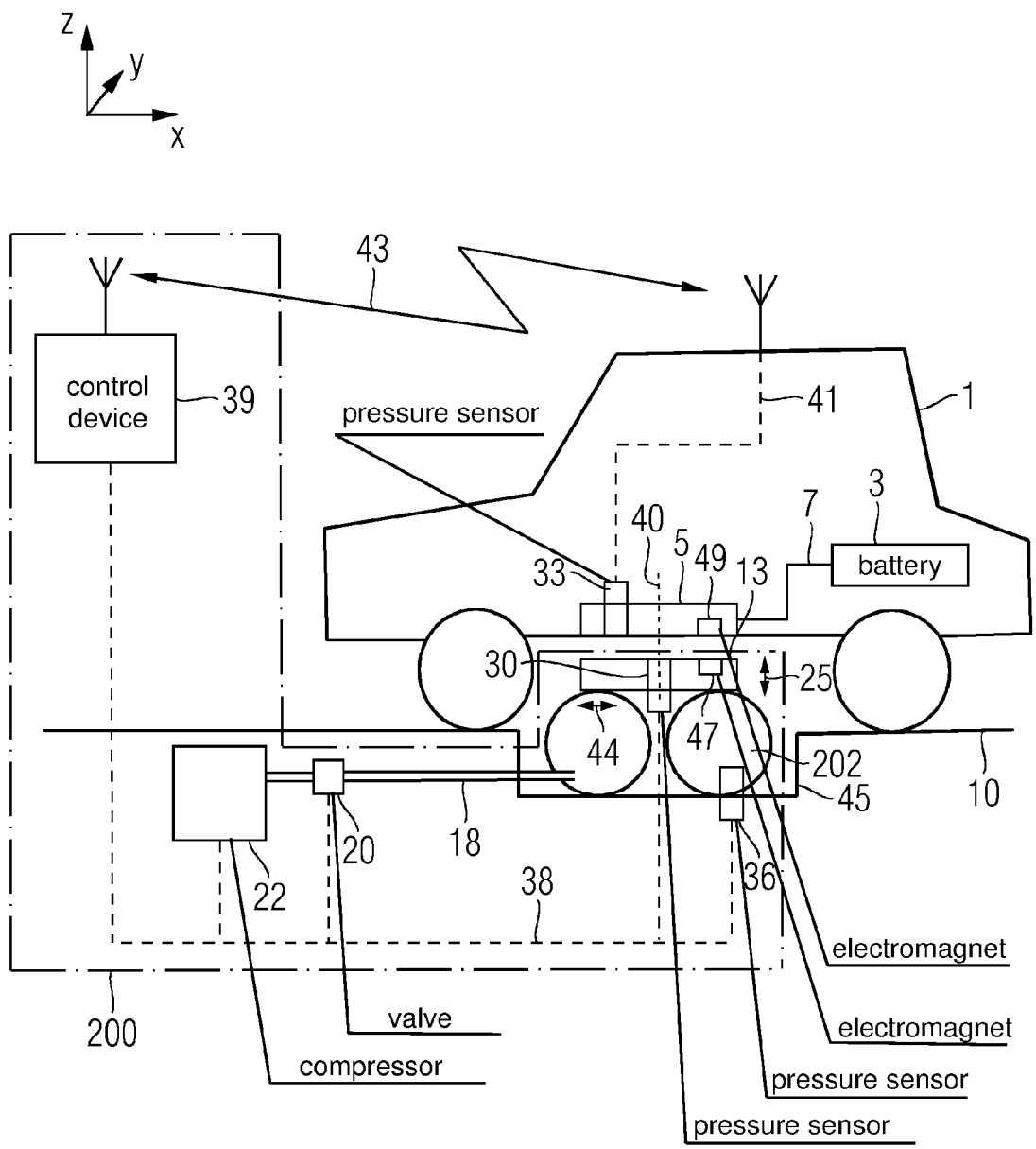

FIG. 2 shows a further exemplary embodiment of a charging device 200. This charging device 200 distinguishes itself from the charging device 12 described on the basis of FIG. 1 in that the holding device has a hose 202 which can be filled with the medium instead of bellows 15. The exemplary embodiment concerns an inner tube 202 which is shown in a filled state in FIG. 2. This hose is toroidal in shape. (The shape of a torus is similar to that of the inner tube of a tire or similar to a rubber ring for swimming.) In the cutaway view in FIG. 2 only two circular interfaces of the torus are visible. In FIG. 2 the second position of the inner tube 202 is shown in which the inner tube and the primary coil arranged thereon protrude from the substrate 10 in the first direction. If the air is released from the inner tube 202, then the primary coil 13 moves downwards with the hose 202 and is completely accommodated by the recess 45.

Figure 3:
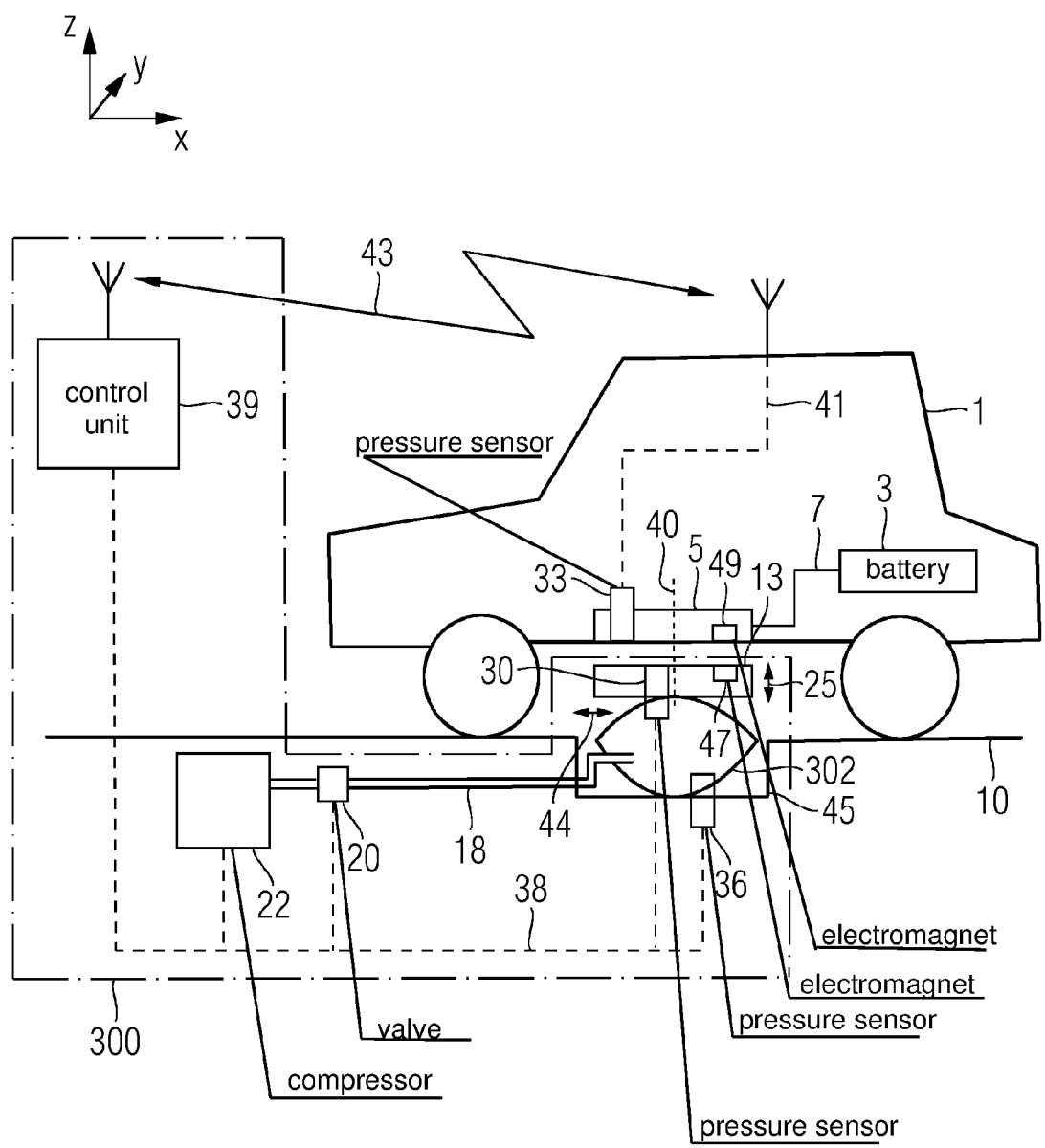

FIG. 3 shows a charging device 300 as a further exemplary embodiment. This charging device 300 only distinguishes itself from the charging device 12 described on the basis of FIG. 1 in that the holding device has a cushion 302 (here: an air cushion 302) which can be filled with the medium instead of bellows 15.

Figure 4:
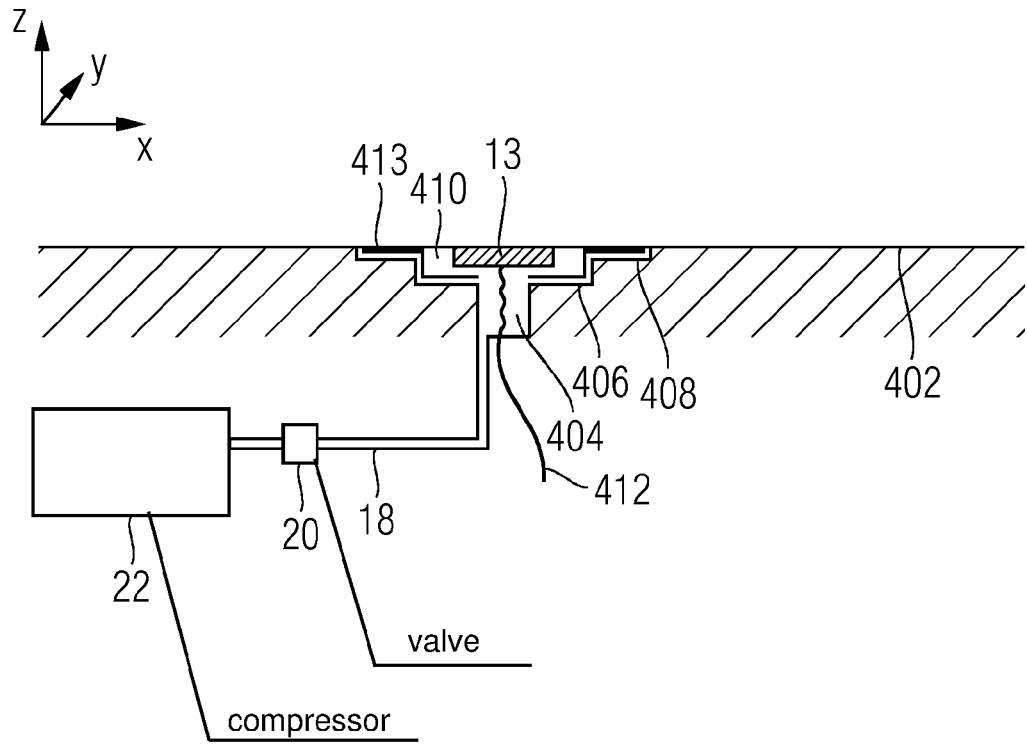

FIG. 4 shows a section of a further exemplary embodiment of a charging device. A hollow space 404 is arranged in a substrate 402. By means of the compressor 22, the valve 20 and the compressed air pipes 18, this hollow space 404 can be filled with a pressurized medium in the form of compressed air. The hollow space 404 has a first ring groove 406 and a second ring groove 408. A sliding bearing 410 in the shape of a flat circular cylinder is located in the first ring groove 406. In this sliding bearing 410 the primary coil 13 is arranged in such a way that it can move in the direction of the X-Y plane, that is to say, can be moved on this plane. In other words, the primary coil 13 in the sliding bearing 410 can be moved in the second direction (direction on the X-Y plane). In other words, the primary coil is suspended freely floating, enabling the primary coil to move in the second direction and/or to be moved. A power supply cable 412 runs to the primary coil 13.

The sliding bearing 410 is connected to the substrate 402 in an airtight manner by means of a flexible membrane 413. The sliding bearing 410 itself also has an airtight design. As a result no air can escape from the hollow space 404.

The membrane 413 encircles the sliding bearing 410 and thereby also the primary coil 413 arranged in the sliding bearing 410. In the exemplary embodiment of FIG. 4, the holding device is formed by the sliding bearing 410 and the annular membrane 413.

FIG. 4 shows the first position of the holding device in which the holding device is completely recessed into the substrate 402. In the first position, the annular membrane is in the second ring groove 408. In this first position the sliding bearing 410 and the membrane 413 together with the surface of the substrate 402 form a smooth surface so that no obstacle (e.g. tripping hazard) protrudes from the substrate 402. The holding device and the primary coil can therefore be installed flush and seamlessly in the substrate/ground.

When the valve 20 is opened, compressed air from the compressor 22 enters the hollow space 404. As a result, the membrane 413 stretches and curves upwards. As a result the sliding bearing 410 with the primary coil 13 is moved in the first direction (i.e. in the Z-direction) towards the secondary coil 5 of the vehicle 1. (The vehicle with the secondary coil is not shown in FIG. 4. It is—as in FIGS. 1 to 3—disconnected via the primary coil.)

The flexible membrane 413 therefore enables the extension of the primary coil in the direction of the secondary coil of the vehicle when the pressure in the hollow space 404 is increased. The annular membrane 413 seals off the hollow space 404 and consequently also the primary coil 13 from contaminants that may arise from the surface of the substrate (e.g. road surface).

As a result of a corresponding increase in the pressure of the medium, the primary coil 13 can now be moved in the direction of the secondary coil until the primary coil 13 comes into contact with the secondary coil of the vehicle. The remaining sequence corresponds to the sequence described in connection with FIG. 1.

Figure 5:
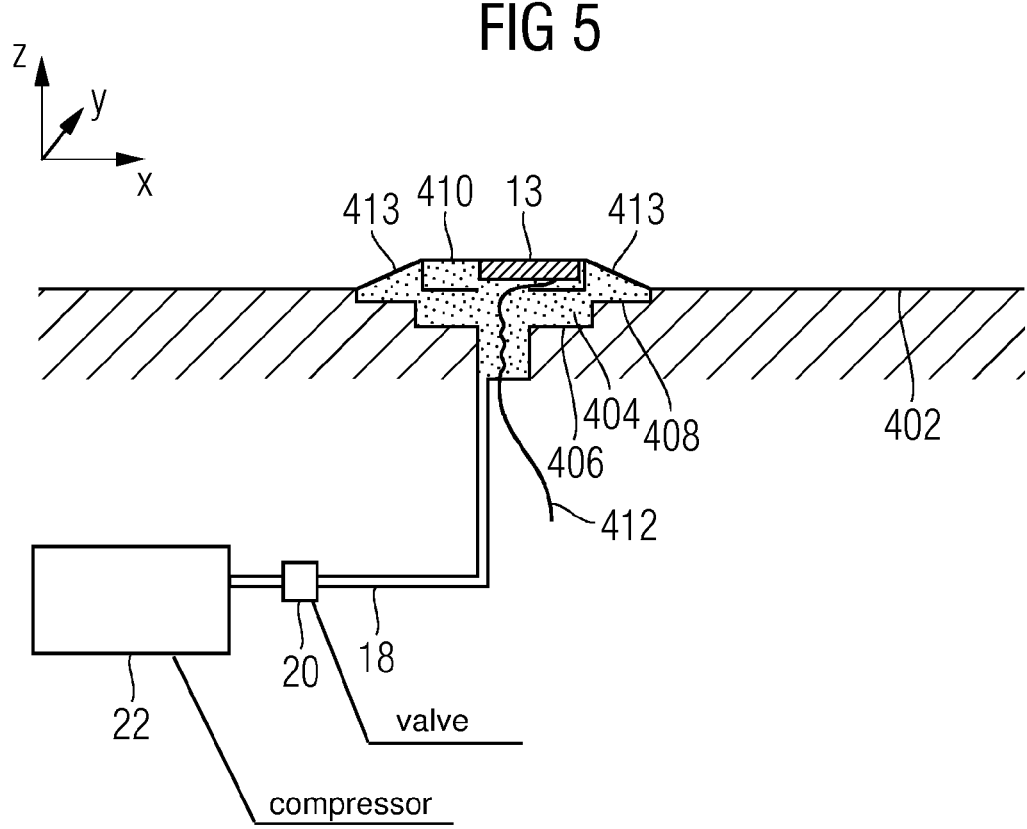

FIG. 5 shows the second position in which the holding device protrudes from the substrate 402 in the first direction (Z-direction). When the valve 20 is now opened and as a result the medium is released from the hollow space 404, the sliding bearing 410 retracts with the primary coil 13 into the first ring groove 406. Likewise, the membrane 413 retracts into the second ring groove 408. Thereby the initial state is then resumed, as shown in FIG. 4.

Figure 6:
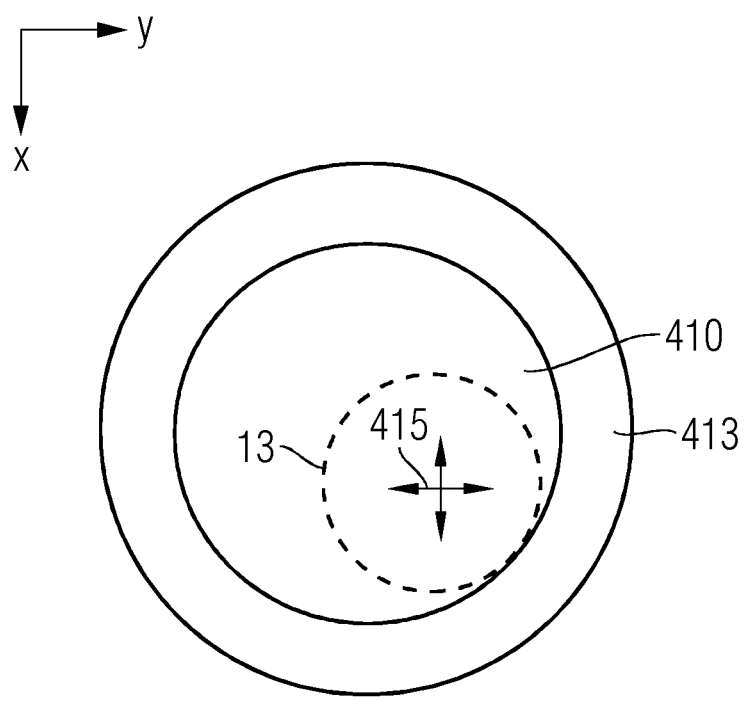

FIG. 6 shows a schematic view of the arrangement according to FIG. 4 in a top view. The annular membrane 413 which encircles the sliding bearing 410 and thereby also the primary coil 13 is clearly recognizable. The primary coil 13 is represented by dotted lines as in the top view this is not visible but is obscured by the top cover of the sliding bearing 410. The ability of the primary coil 13 to be moved in the second direction within the X-Y plane is indicated by means of arrows 415. In another exemplary embodiment the membrane 413 may also be annular in design and completely obscure the top of the sliding bearing 410. However, the membrane may also have another embodiment, it may, for example, also be oval.

FIG. 7 shows another exemplary embodiment of the method for positioning the primary coil in a flow chart. The starting point is the first position of the holding device in which the holding device and the primary coil are recessed in the substrate (block 700). Firstly, the pressure of the medium (e.g. the pressure of the compressed air) is increased and as a result the primary coil moves in the first direction towards the secondary coil of the vehicle (block 710). When the primary coil comes into contact with the secondary coil, this contact is detected by means of a pressure sensor (block 720). The primary coil now also comes into contact with the secondary coil but can be moved in the second direction on account of the elasticity of the holding device. Now there is a direct flow of current both through the primary coil and through the secondary coil. Magnetic fields are created in both coils. As a result of the attractive forces between the magnetic fields, the primary coil aligns itself concentrically with the secondary coil. This produces optimum alignment of the primary coil with the secondary coil (block 730).

Subsequently the pressure of the medium is further increased. This results in the pressure of the primary coil against the secondary coil being further increased, as a result of which the frictional forces between the primary coil and the secondary coil increase. As a result of these frictional forces, the aligned primary coil is fixed on the secondary coil so that the primary coil can no longer slip during the subsequent charging process. Thereupon, the direct current flowing through the primary coil and the secondary coil is disconnected and the pressure of the medium is kept constant (block 740). This is now the second position of the holding device (block 750). Now the actual inductive charging process can be performed, i.e. the transmission of electricity from the primary coil to the secondary coil can commence.

The charging device and the method described have a series of advantages:

- The air gap between the primary coil and the secondary coil is significantly reduced through the use of a pressurized medium and ideally the air gap can be reduced to zero.
- Brief energizing of the primary coil brings about fine positioning (fine alignment) of the primary coil and the secondary coil.
- When the primary coil is correctly aligned with the secondary coil, the position of the primary coil also remains unchanged if the vehicle moves (e.g. if the vehicle rocks or if the vehicle load changes as a result of the driver getting in) as the pressurized medium presses the primary coil further against the vehicle. There is a sufficient pressure reserve in the hollow space of the holding device (in particular in the bellows, hose, cushion or under the membrane) for this purpose.
- As a result of the elasticity of the holding device, the primary coil and the secondary coil are protected from mechanical damage when the vehicle moves.
- In addition, the coils can be protected from mechanical damage by an elastic, e.g. foam-like coating.
- The pressure of the medium can be influenced and maintained specifically by means of a switchable valve in the supply line for the medium.
- When the power supply is disconnected (and therefore, for example, also in the event of power failure), the valve opens in such a way that the pressure in the medium is reduced. As a result, the holding device returns to its first position (for example, the bellows or the inner tube or the air cushion collapse). The primary coil sinks downwards and disappears completely in the recess of the substrate. A secure state is thus achieved in which the primary coil is securely protected from damage.
- Contact between the primary coil and the secondary coil is detected by a pressure sensor or switch which is located on the top of the primary coil and/or the secondary coil.
- No mechanical drives which can get stuck and/or adhere as a result of dirt or liquids are required.

Depending on the embodiment of the primary coil and the secondary coil, in the aligned state the air gap between the primary coil and the secondary coil can be reduced to almost zero. As a result, the maximum transferable power can be considerably increased, for example, from 3.3 kW to 12 kW with simultaneous reduction of the coil diameter. It is furthermore advantageous that during inductive charging no object can come between the primary coil and the secondary coil because no air gap or almost none exists. In the charging device shown, it is furthermore advantageous that the gap between the primary coil and the secondary coil can also remain constant (ideally remains reduced to zero) when the vehicle moves, in other words when, for example, a person gets into the vehicle or rocks or sways the vehicle. As a result of the flexibility/elasticity of the holding device, in other words, for example, as a result of the flexibility/elasticity of the bellows, the inner tube, the air cushion or the membrane, the primary coil yields to the movement of the vehicle or follows the movement of the vehicle. For this the pressure of the pressurized medium does not need to be increased because there is a sufficient pressure reserve in the medium. This flexibility and/or elasticity of the holding device furthermore has the advantage that the coils are not damaged by movements of the vehicle. In addition, a thin, elastic surface (e.g. an elastic coating) can be applied to the secondary coil and/or to the primary coil to improve the protection of the coils still further.

When the charging device is disconnected (i.e. in the case of scheduled shutdown or also an emergency shutdown), the pressure of the medium in the holding device is quickly reduced. On the one hand, this can take place as a result of opening the valve or also as a result of evacuation of the holding device by means of a pump or by means of the compressor. The holding device with the primary coil moves away from the secondary coil of the vehicle as a result and resumes its secure idle position, or rather its position in the substrate (first position).

The valve 20 can be designed in such a way that it reduces the pressure of the medium as soon as the electric valve 20 ceases to be supplied with current (e.g. in the event of power failure). In such a case, for example, the compressed air is therefore released from the holding device. This ensures that the holding device assumes its secure state with the primary coil (first position) and does not persist in the charging position (second position). Such persistence in the second position could namely result in damage when the vehicle moved (e.g. when driving away). The charging device is also intrinsically safe.

The first position of the holding device can also be described as the idle position, idle state, secure state, retracted state or initial state. The second position of the holding device can also be described as the operating position, charging position or extended state.

The first direction corresponds to the Z-direction, in other words the vertical direction, in the exemplary embodiment. The second direction corresponds to a horizontal direction in the exemplary embodiment, i.e. a direction which is on the X-Y plane, in other words the second direction is aligned perpendicularly to the first direction.

A method was described with which the primary coil can be securely and reliably positioned on the vehicle for inductive charging.

The invention claimed is:

1. A charging device for inductively charging a drive battery of an electrically-drivable vehicle, the charging device comprising:
   an at least partially elastic holding device; and
   a primary coil disposed on said holding device;
   said primary coil being movable in a first direction towards a secondary coil of the vehicle by a pressurized medium; and
   said primary coil being movable in a second direction perpendicular to said first direction due to an electric current applied to said primary coil.

2. The charging device according to claim 1, wherein the pressurized medium is a gas.

3. The charging device according to claim 1, wherein the pressurized medium is compressed air.

4. The charging device according to claim 1, wherein said holding device connects said primary coil to a substrate.

5. The charging device according to claim 1, wherein said holding device has bellows to be filled with the pressurized medium.

6. The charging device according to claim 5, wherein said bellows are expansion bellows.

7. The charging device according to claim 5, wherein said primary coil is disposed at one end of said bellows.

8. The charging device according to claim 1, wherein said holding device has a hose to be filled with the pressurized medium or a cushion to be filled with the pressurized medium.

9. The charging device according to claim 1, wherein said holding device has a membrane to be curved upwards by the pressurized medium.

10. The charging device according to claim 9, wherein said membrane encircles said primary coil.

11. The charging device according to claim 1, wherein said holding device has an elasticity enabling a displacement of said primary coil in a second direction.

12. The charging device according to claim 1, which further comprises a sliding bearing, said primary coil being stored in said sliding bearing enabling a displacement of said primary coil in a second direction.

13. The charging device according to claim 1, which further comprises at least one of a pressure sensor measuring a contact pressure between said primary coil and said secondary coil or a pressure sensor measuring a pressure of the pressurized medium.

14. The charging device according to claim 1, wherein said holding device is recessed in a substrate in a first position.

15. The charging device according to claim 14, wherein said holding device protrudes from the substrate in said first direction in a second position.

16. The charging device according to claim 1, wherein said first direction is a vertical direction and said second direction is a horizontal direction.

17. The charging device according to claim 11, wherein said first direction is a vertical direction and said second direction is a horizontal direction.

18. The charging device according to claim 12, wherein said first direction is a vertical direction and said second direction is a horizontal direction.

19. The charging device according to claim 1, wherein said primary coil is movable in said first direction towards the secondary coil of the vehicle by applying the pressurized medium to said holding device.

20. A method for positioning a primary coil for inductively charging a drive battery of an electrically-drivable vehicle, the method comprising the following steps:
   moving the primary coil in a first direction towards a secondary coil of the vehicle by a pressurized medium and by an at least partially elastic holding device; and
   conducting an electric current through the primary coil thereby causing the primary coil to move in a second direction perpendicular to said first direction.

21. The method according to claim 20, wherein the pressurized medium is a gas.

22. The method according to claim 20, wherein the pressurized medium is compressed air.

23. The method according to claim 20, which further comprises carrying out the step of moving the primary coil in the first direction by using the pressurized medium until the primary coil contacts the secondary coil.

24. The method according to claim 23, which further comprises detecting the contact by using at least one pressure sensor.

25. The method according to claim 24, which further comprises measuring a contact pressure between the primary coil and the secondary coil by using the at least one pressure sensor or measuring a pressure of the pressurized medium by using the at least one pressure sensor.

26. The method according to claim 20, which further comprises causing the holding device to enable a displacement of the primary coil in a second direction.

27. The method according to claim 20, which further comprises conducting the electric current through the primary coil thereby causing the primary coil to align itself with the secondary coil.

28. The method according to claim 27, which further comprises conducting the electric current through an electromagnet disposed on the primary coil thereby causing the primary coil to align itself with the secondary coil.

29. The method according to claim 27, which further comprises aligning the primary coil concentrically with the secondary coil.

30. The method according to claim 27, which further comprises increasing a pressure of the pressurized medium after alignment of the primary coil and the secondary coil thereby fixing a position of the aligned primary coil in relation to the secondary coil.

31. The method according to claim 26, wherein the first direction is a vertical direction and the second direction is a horizontal direction.

32. The method according to claim 20, which further comprises moving the primary coil in the first direction towards the secondary coil of the vehicle by applying the pressurized medium to the at least partially elastic holding device.

33. The device according to claim 1, comprising: an electromagnet disposed on said primary coil and configured for moving said primary coil in the second direction due an electric current applied thereto.

34. The method according to claim 27, which further comprises conducting the electric current through an electromagnet disposed on the primary coil thereby causing the primary coil to move in the second direction.

\* \* \* \* \*